(12) United States Patent
Garcarz et al.

(10) Patent No.: US 12,155,532 B1
(45) Date of Patent: Nov. 26, 2024

(54) USING MACHINE LEARNING FOR ONLINE APPLICATION DETECTION

(71) Applicant: Cisco Technology, Inc., San Jose, CA (US)

(72) Inventors: Michal Wladyslaw Garcarz, Cracow (PL); Jean-Philippe Vasseur, Combloux (FR); Guy Keinan, Kfar-Saba (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/201,555

(22) Filed: May 24, 2023

(51) Int. Cl.
*H04L 41/0894* (2022.01)
*H04L 41/16* (2022.01)

(52) U.S. Cl.
CPC .......... *H04L 41/0894* (2022.05); *H04L 41/16* (2013.01)

(58) Field of Classification Search
CPC ............................ H04L 41/0894; H04L 41/16
See application file for complete search history.

(56) References Cited

U.S. PATENT DOCUMENTS

| | | | |
|---|---|---|---|
| 10,193,811 B1 * | 1/2019 | Satyanarayana | ........ H04L 45/24 |
| 10,958,532 B2 | 3/2021 | Peterkin | |
| 11,552,867 B1 * | 1/2023 | Vega | .................... G06F 18/2431 |
| 11,582,157 B2 | 2/2023 | Hughes | |
| 2012/0240185 A1 * | 9/2012 | Kapoor | ............... H04L 41/0866 726/1 |
| 2018/0359172 A1 * | 12/2018 | Yadav | .................... H04W 40/18 |
| 2019/0230038 A1 * | 7/2019 | Hughes | .................. H04L 41/147 |
| 2019/0260683 A1 * | 8/2019 | Hughes | .................... H04L 47/00 |
| 2020/0028771 A1 * | 1/2020 | Wong | ..................... H04L 43/067 |
| 2020/0259731 A1 * | 8/2020 | Sivaraman | ............ H04L 43/026 |
| 2021/0112011 A1 * | 4/2021 | K S | ....................... H04L 41/5009 |
| 2021/0160275 A1 * | 5/2021 | Anderson | ............. H04L 63/306 |
| 2021/0349996 A1 | 11/2021 | McGrew et al. | |
| 2023/0006929 A1 | 1/2023 | Mayya et al. | |
| 2023/0012308 A1 * | 1/2023 | Kommula | ............. H04L 47/822 |
| 2023/0055046 A1 * | 2/2023 | Whited | ................. H04L 47/122 |
| 2023/0128098 A1 | 4/2023 | Agrawal et al. | |
| 2023/0164043 A1 * | 5/2023 | Sirov | .................. H04L 41/5032 709/224 |

(Continued)

OTHER PUBLICATIONS

"Optimizing Software as a Service (SAAS) with Aruba SD-WAN", Technical Document, TD_OptimizingSaaS_102919, 2019, 4 pages, Hewlett Packard Enterprise Development LP.

*Primary Examiner* — Blake J Rubin
(74) *Attorney, Agent, or Firm* — BEHMKE INNOVATION GROUP LLC; James M. Behmke; James J. Wong

(57) ABSTRACT

In one embodiment, a device obtains telemetry data associated with an online application accessible via a network. The device trains, based on the telemetry data, a machine learning model to determine whether a given address in the network is associated with the online application. The device uses the machine learning model to generate a listing of network addresses associated with the online application. The device provides the listing of network addresses for use by an application detection service in the network to determine that an initial packet of a traffic flow is associated with the online application based on a match between a destination address of that packet and a network address in the listing of network addresses.

20 Claims, 10 Drawing Sheets

(56) References Cited

U.S. PATENT DOCUMENTS

| | | | |
|---|---|---|---|
| 2023/0188561 A1* | 6/2023 | Finkelshtien | H04L 63/1466 726/22 |
| 2023/0209230 A1* | 6/2023 | Larrigan | H04J 14/0267 398/58 |
| 2023/0308529 A1* | 9/2023 | Lin | H04L 65/80 |

* cited by examiner

USING MACHINE LEARNING FOR ONLINE APPLICATION DETECTION

TECHNICAL FIELD

The present disclosure relates generally to computer networks, and, more particularly, to using machine learning for online application detection.

BACKGROUND

Many applications today are increasingly being hosted online, such as via a software-as-a-service (SaaS) hosting model. From a networking perspective, the treatment of a given traffic flow may also be dependent on the application associated with that flow. For instance, the network may treat the traffic associated with a videoconferencing application very differently than that of a web browser simply calling up a webpage. This means that correctly detecting the application associated with any given traffic flow is paramount, as misidentifying the application can mean improper enforcement of a network policy with respect to that flow.

Traditionally, deep packet inspection (DPI) offers insight into the application associated with any given traffic flow. Generally, such an approach entails looking at the packet payloads of the flow, which can offer rich information to discern which application generated that data. However, with data privacy becoming increasingly important, so too has the use of packet encryption (e.g., using Transport Layer Security), making DPI largely inefficient without resorting to more advanced measures (e.g., by intercepting the cryptographic information to perform decryption at an intermediate location). In addition, any classification of the traffic flow after its initial packet can lead to the potential that the network applies the wrong policy to the traffic, in the meantime, and may cause service disruptions.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
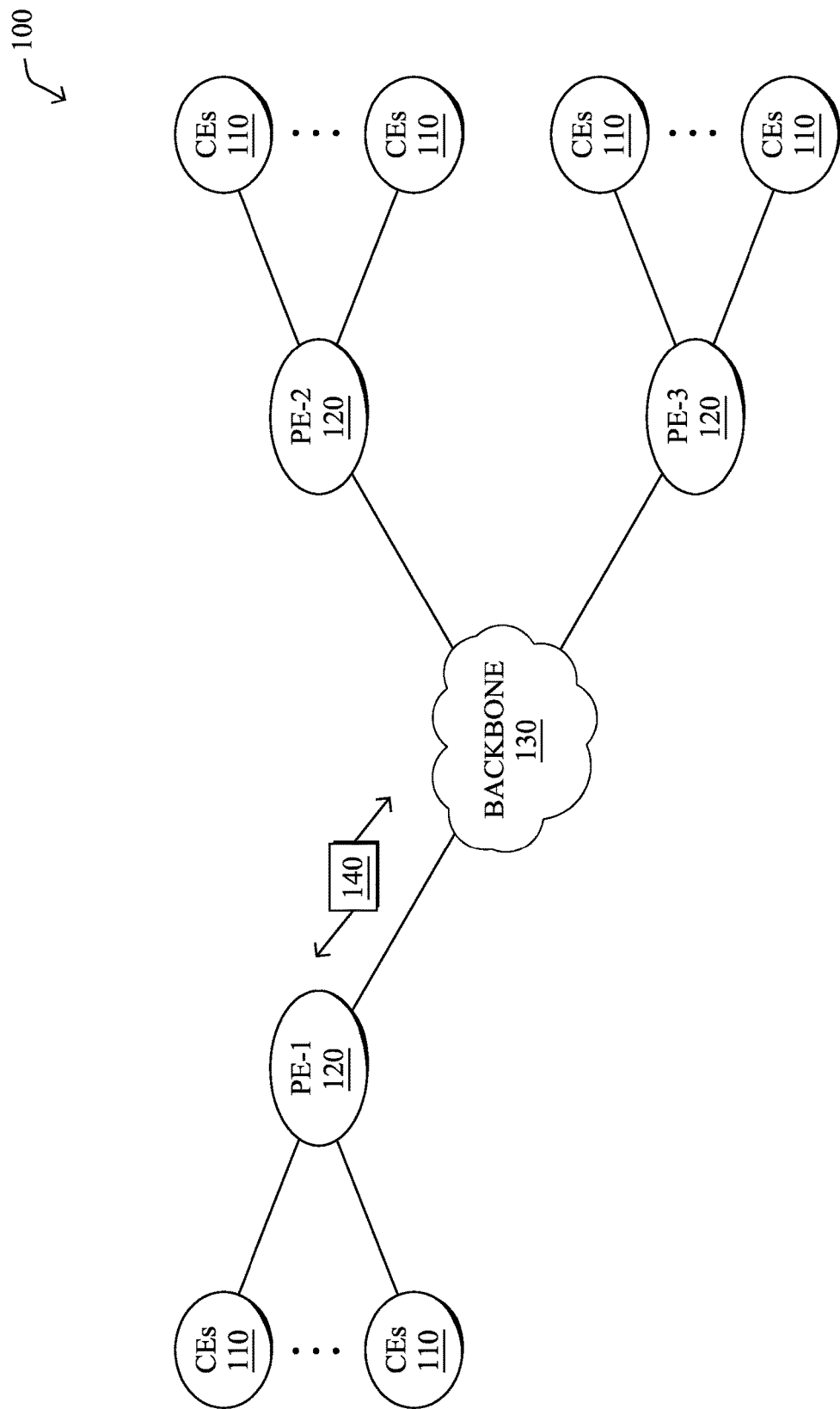
FIGS. 1A-1B illustrate an example communication network.

According to one or more embodiments of the disclosure, a device obtains telemetry data associated with an online application accessible via a network. The device trains, based on the telemetry data, a machine learning model to determine whether a given address in the network is associated with the online application. The device uses the machine learning model to generate a listing of network addresses associated with the online application. The device provides the listing of network addresses for use by an application detection service in the network to determine that an initial packet of a traffic flow is associated with the online application based on a match between a destination address of that packet and a network address in the listing of network addresses.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection). Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
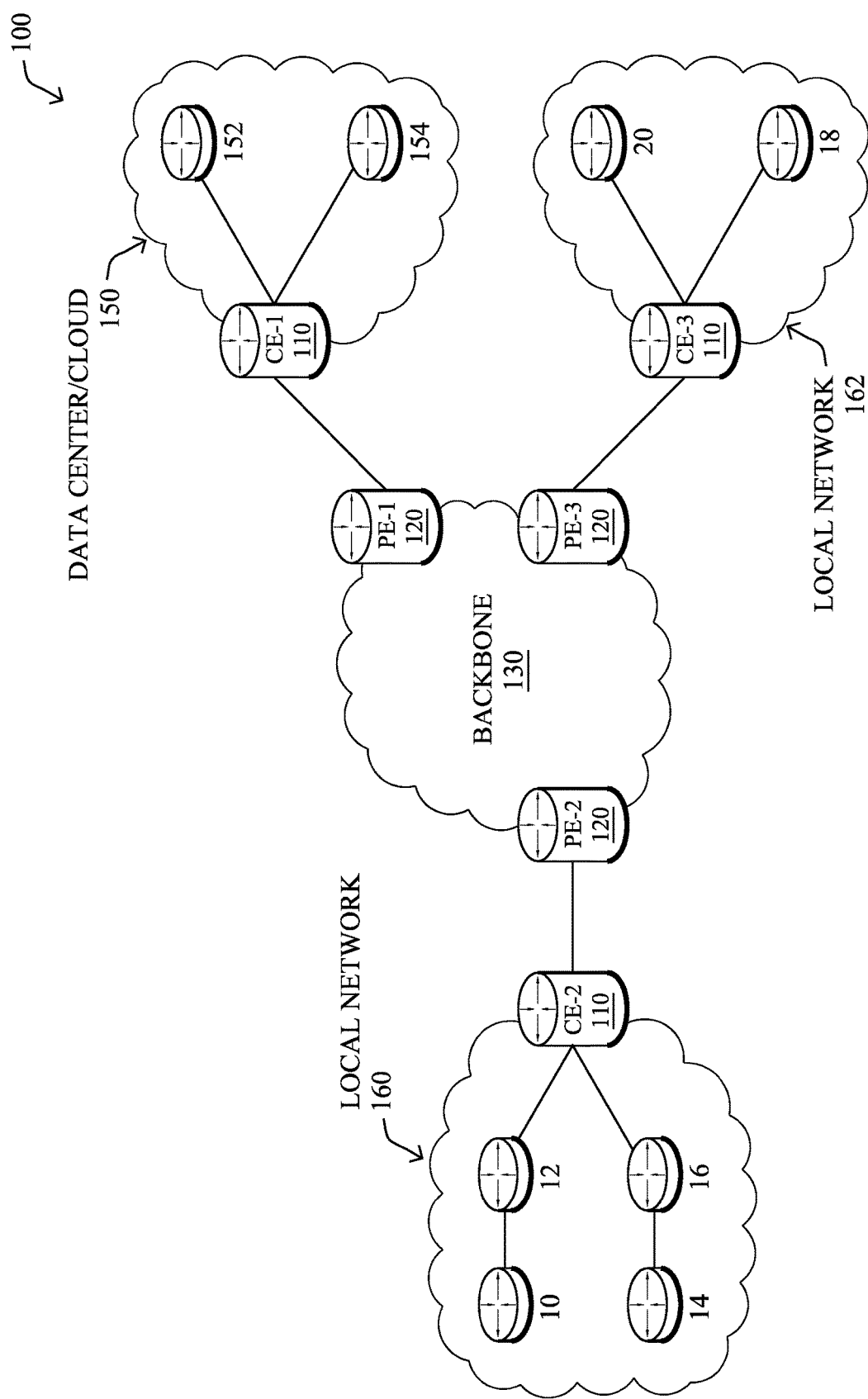

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
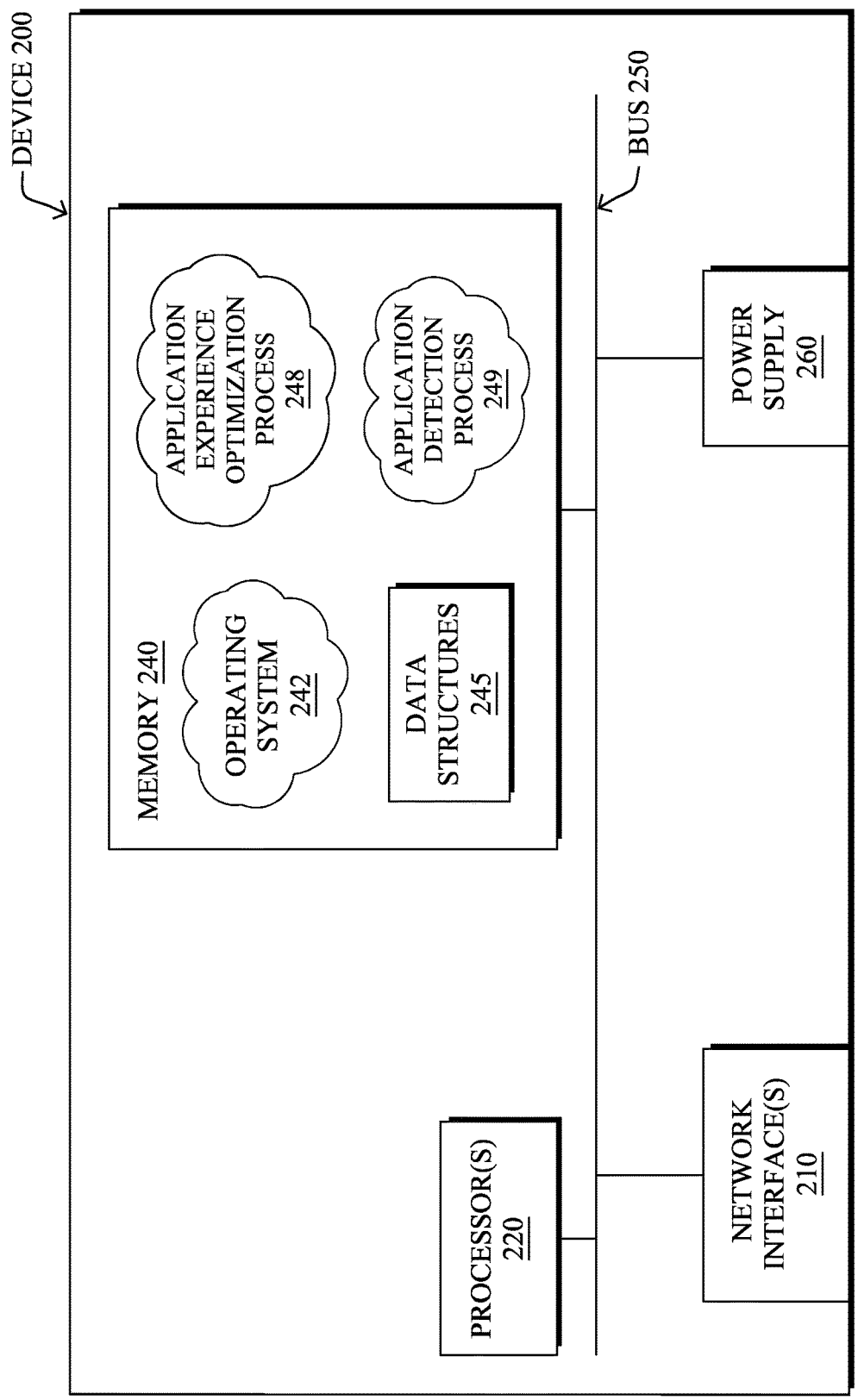
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 and/or application detection process 249 may include computer executable instructions that, when executed by processor(s) 220, cause device 200 to perform the techniques described herein. To do so, in some embodiments, application experience optimization process 248 and/or application detection process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or application detection process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 and/or application detection process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
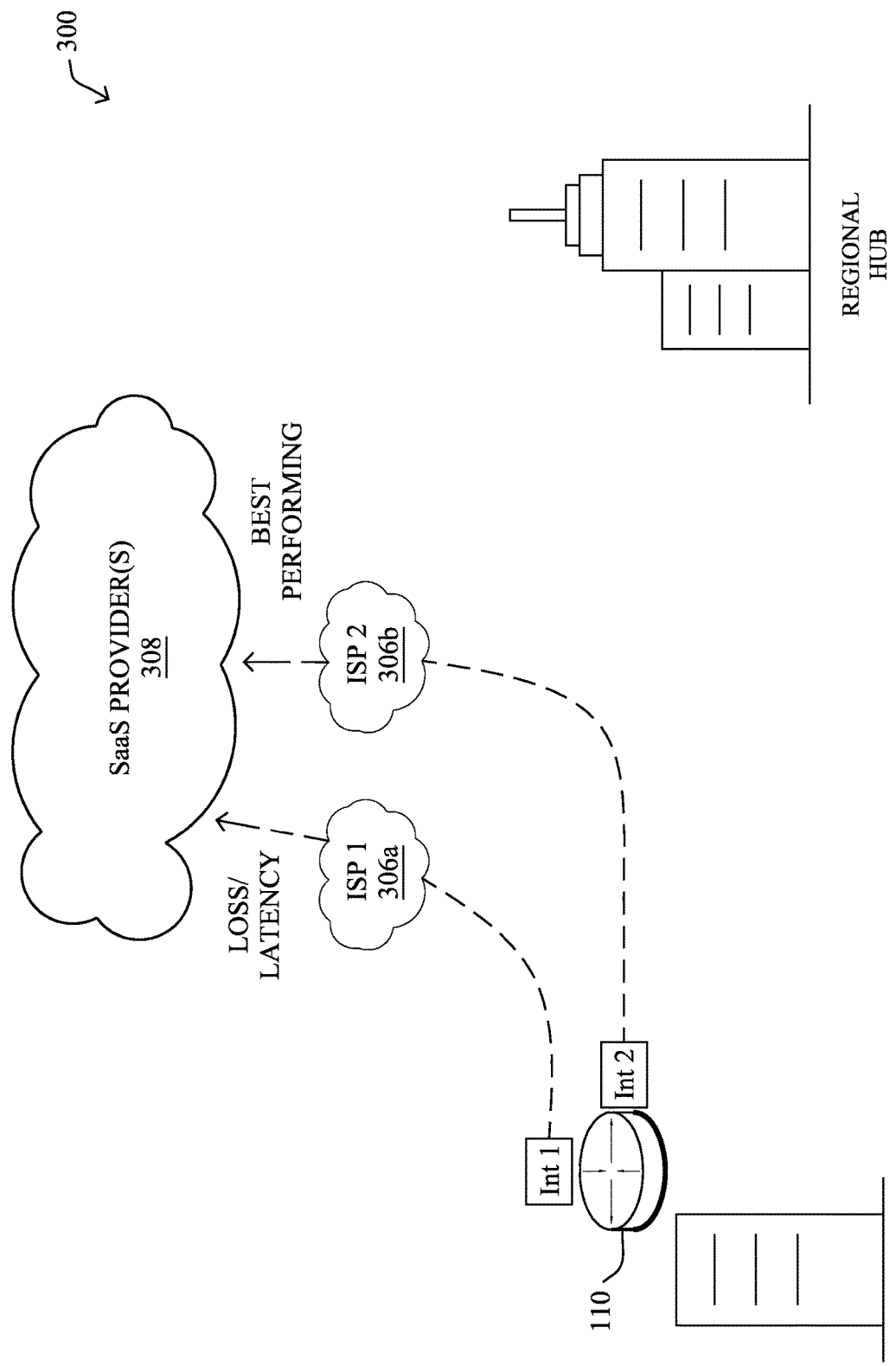
FIGS. 3A-3B illustrate example network deployments.
Figure 3B:
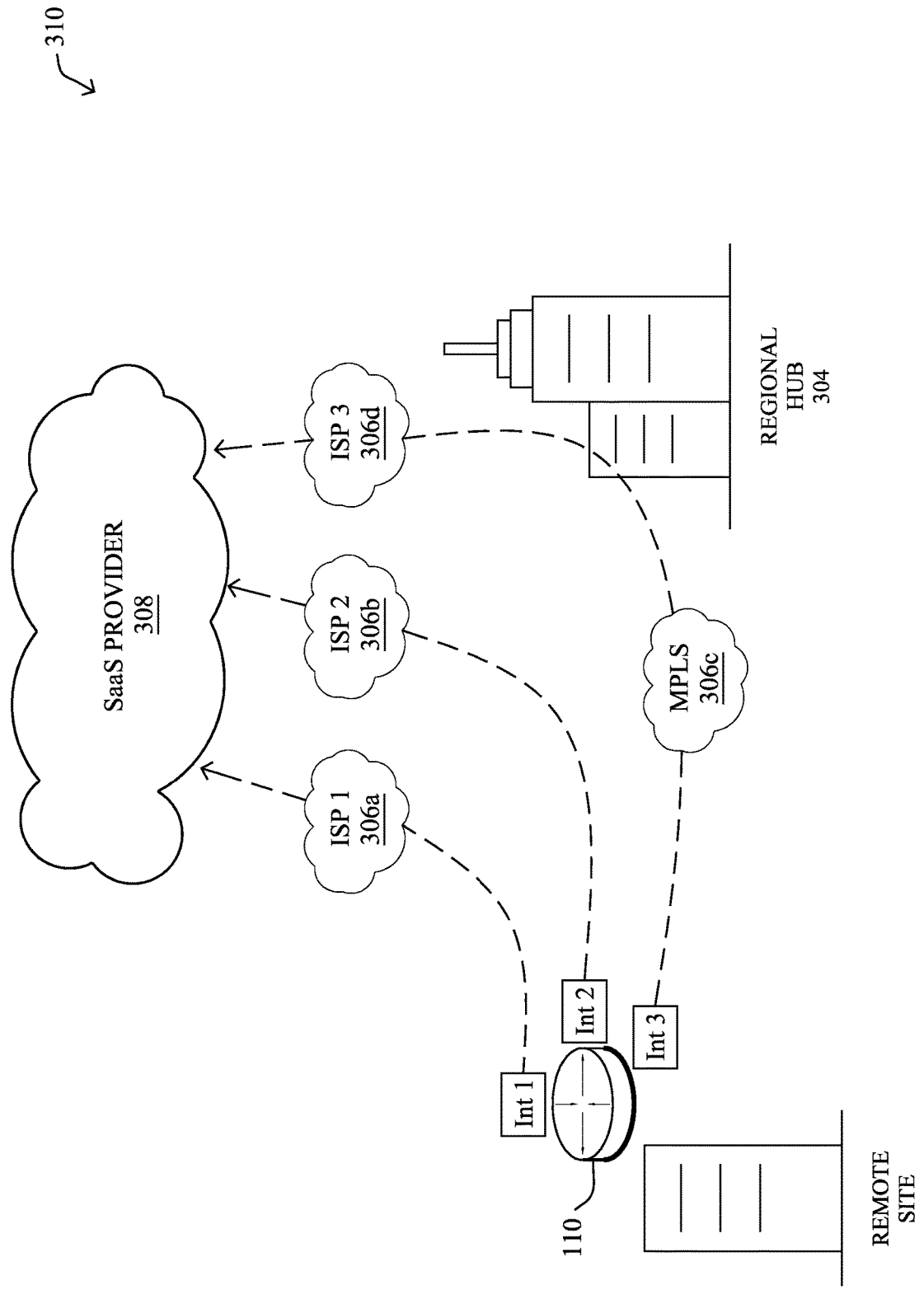

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g. ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
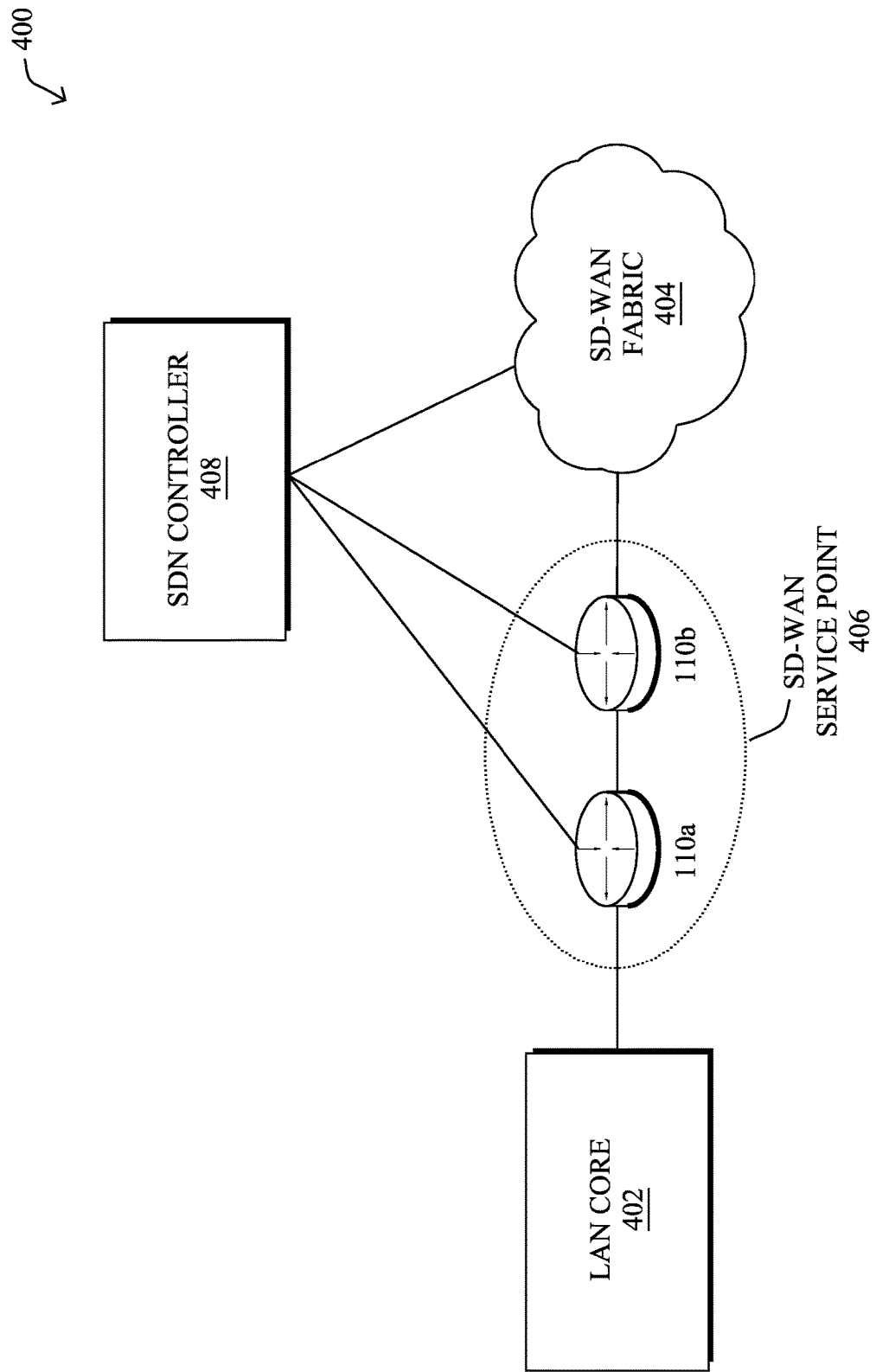
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance. SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g. MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;

- Internet, MPLS. LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela. CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:
- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
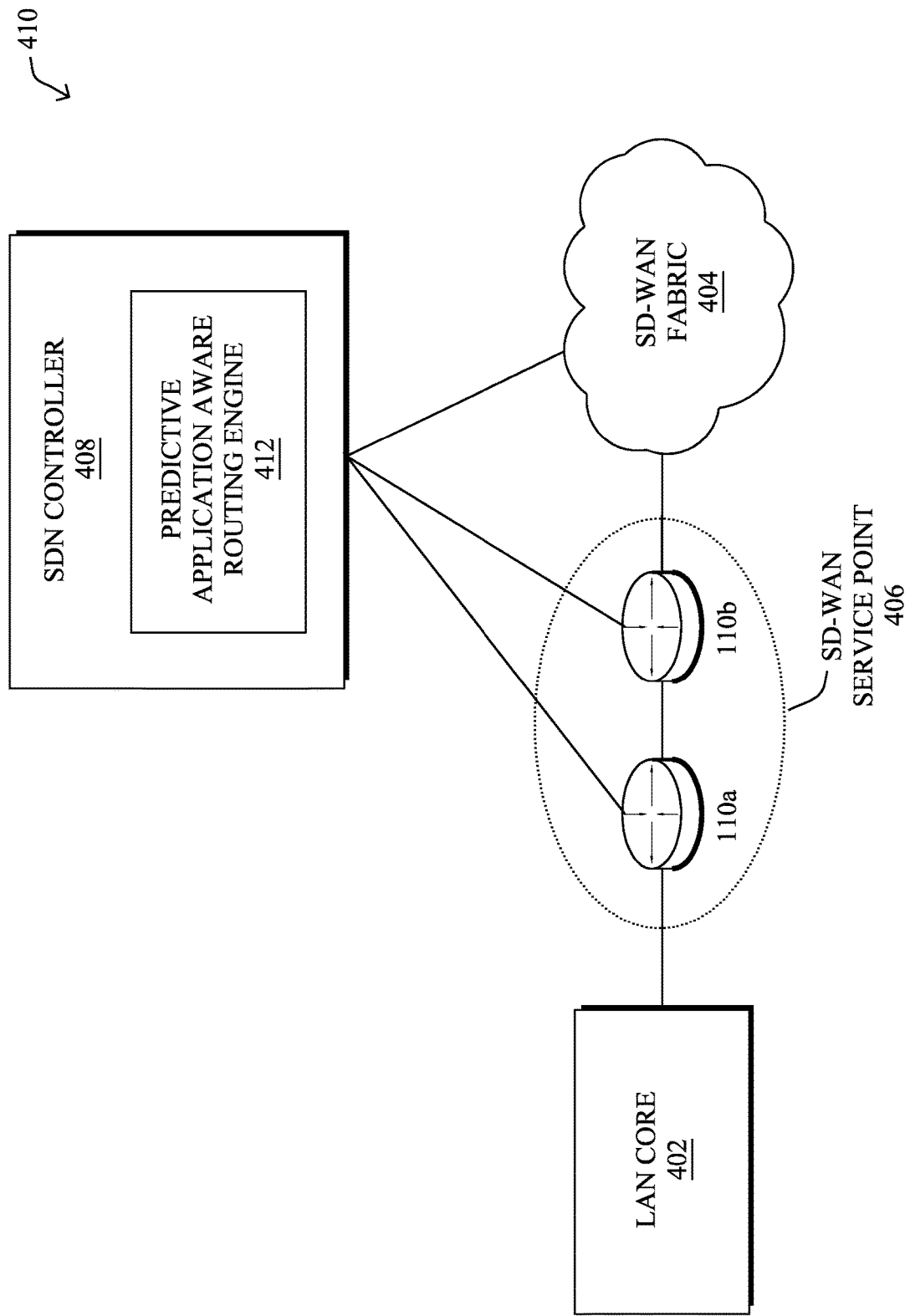

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN. Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY. MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking, instead of taking a siloed approach where networking systems poorly understand user satisfaction. Cognitive Networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, machine learning has now made it possible to predict the behavior of online applications. However, such predictions are predicated on first recognizing the particular application associated with a traffic flow so that the prediction system can select the appropriate prediction model. Beyond even predictive routing, application recognition plays a vital role in many networking devices such as routers and firewalls. For instance, such information often drives other decisions such as which network paths and services (e.g., Network Address Translation, etc.) are used, particularly in the case of SD-WANs.

Figure 5:
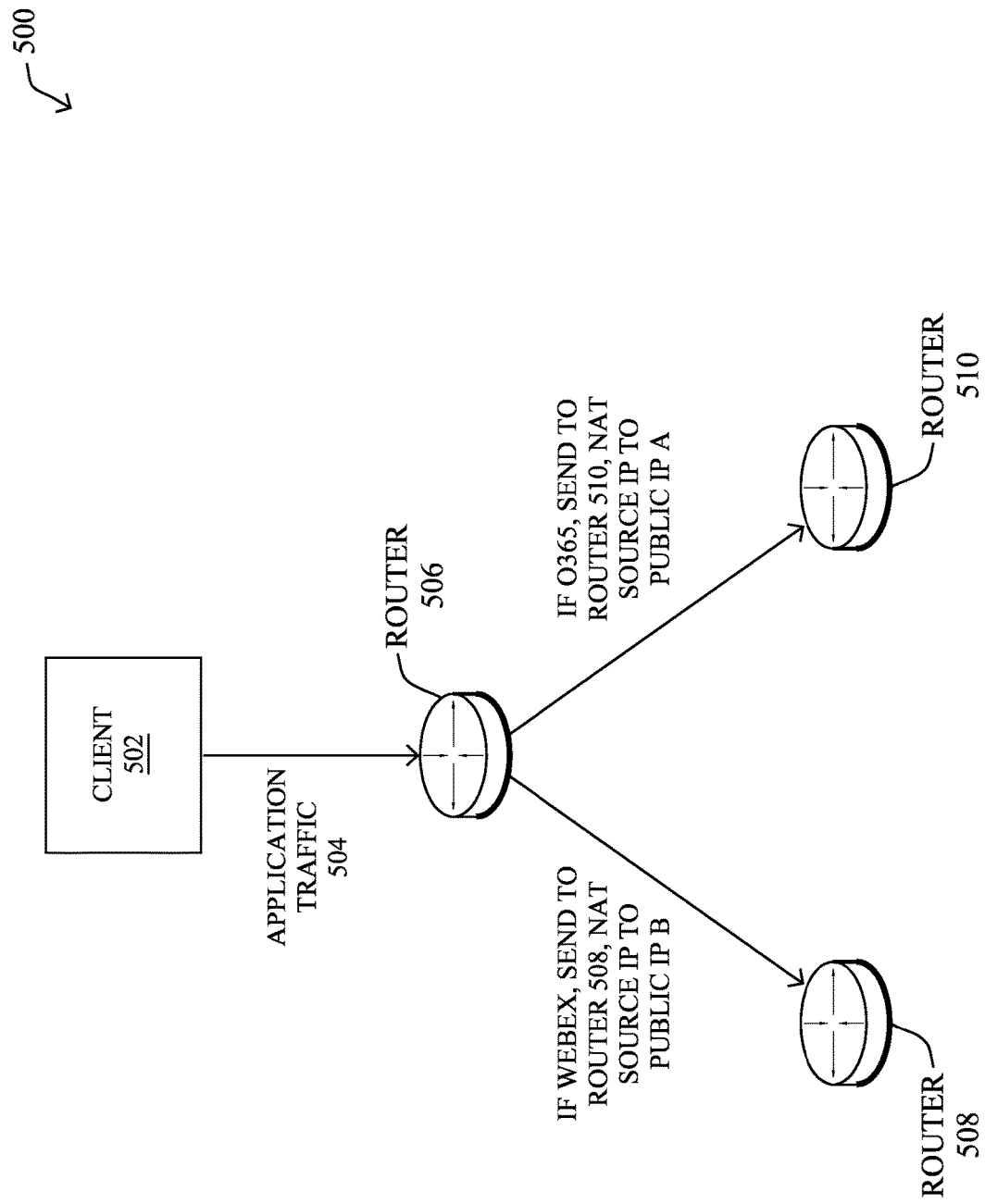
FIG. 5 illustrates an example of a device applying a network policy to application traffic based on its associated application.

By way of example, consider network 500 in FIG. 5 in which an endpoint 502 sends application traffic 504 to a router 506 destined for a particular online application. Now, assume that router 506 has been configured with a policy that specifies that application traffic for WebEx should be sent to router 508 and NAT the source IP address to public IP address B. However, if the application traffic is for Office 365 (O365), it should be sent to router 510 and the source IP address should be NAT'ed to public IP address A. Thus, any misidentification of the application associated with application traffic 504 from its very first packet will result in a policy violation.

Unfortunately, many online applications are SaaS-based and that introduces specific challenges for application detection functionality. Such applications are cloud-based, deployed dynamically, usually via containers, and scaled automatically (up or down). In addition, their locations can also change, sometimes deployed in multiple public clouds, served via multiple content delivery network (CDN) providers, etc. As a result, those applications are often changing region and IP address. In addition, data privacy using the Internet is compulsory and most application traffic now uses encryption to ensure data privacy. Indeed, the adoption of Transport Layer Security (TLS) 1.3, QUIC, DNS-over-HTTPS, and other modern encrypted protocols requires extending standard deep packet inspection (DPI) and calls for innovative approaches which can learn about Internet traffic without looking into packets' payload and still respond to the need.

One potential way to perform first packet classification for traffic steering/application identification without looking into any payload and calls for functions is by learning Internet endpoints and classifying their purposes/applications, instead of the actual transaction's payload. Such classification relies on L3 and L4 attributes and requires very accurate models. To facilitate this, some large vendors have even started to publish feeds with their list of IP addresses, domains, and certificates per each application. Thanks to solutions like Cisco Software-Defined Application Visibility and Control (SDAVC) that can consume those feeds, application recognition functionality for encrypted traffic can be based on list of IP addresses for server hosting those applications to augment classic DPI techniques or where they cannot be applied at all. Unfortunately, though:

Most SaaS vendors today do not publish such feeds at all (e.g. Twitter, Telegram)

Some SaaS vendors do publish very incomplete/partial feeds (Salesforce)

Only a few vendors (e.g., Microsoft, WebEx) currently do publish high quality feeds, but sometimes even those are not updated.

—Using Machine Learning for Online Application Detection—

The techniques herein allow for the recognition of the application associated with network traffic through the use of machine learning. In some aspects, the techniques herein can use network telemetry, as well as external source information in the cloud to train a classifier able to accurately identify the application based on the IP address listed in the packets of the traffic. Doing so allows the processing device to identify the application from the very first packet of the flow and apply the relevant policy to it.

Illustratively, the techniques described herein may be performed by hardware, software, and/or firmware, such as in accordance with recommendation policy manager process 249, which may include computer executable instructions executed by the processor 220 (or independent processor of interfaces 210) to perform functions relating to the techniques described herein, in conjunction with application experience optimization process 248.

Specifically, according to various embodiments, a device obtains telemetry data associated with an online application accessible via a network. The device trains, based on the telemetry data, a machine learning model to determine whether a given address in the network is associated with the online application. The device uses the machine learning model to generate a listing of network addresses associated with the online application. The device provides the listing of network addresses for use by an application detection service in the network to determine that an initial packet of a traffic flow is associated with the online application based on a match between a destination address of that packet and a network address in the listing of network addresses.

Figure 6:
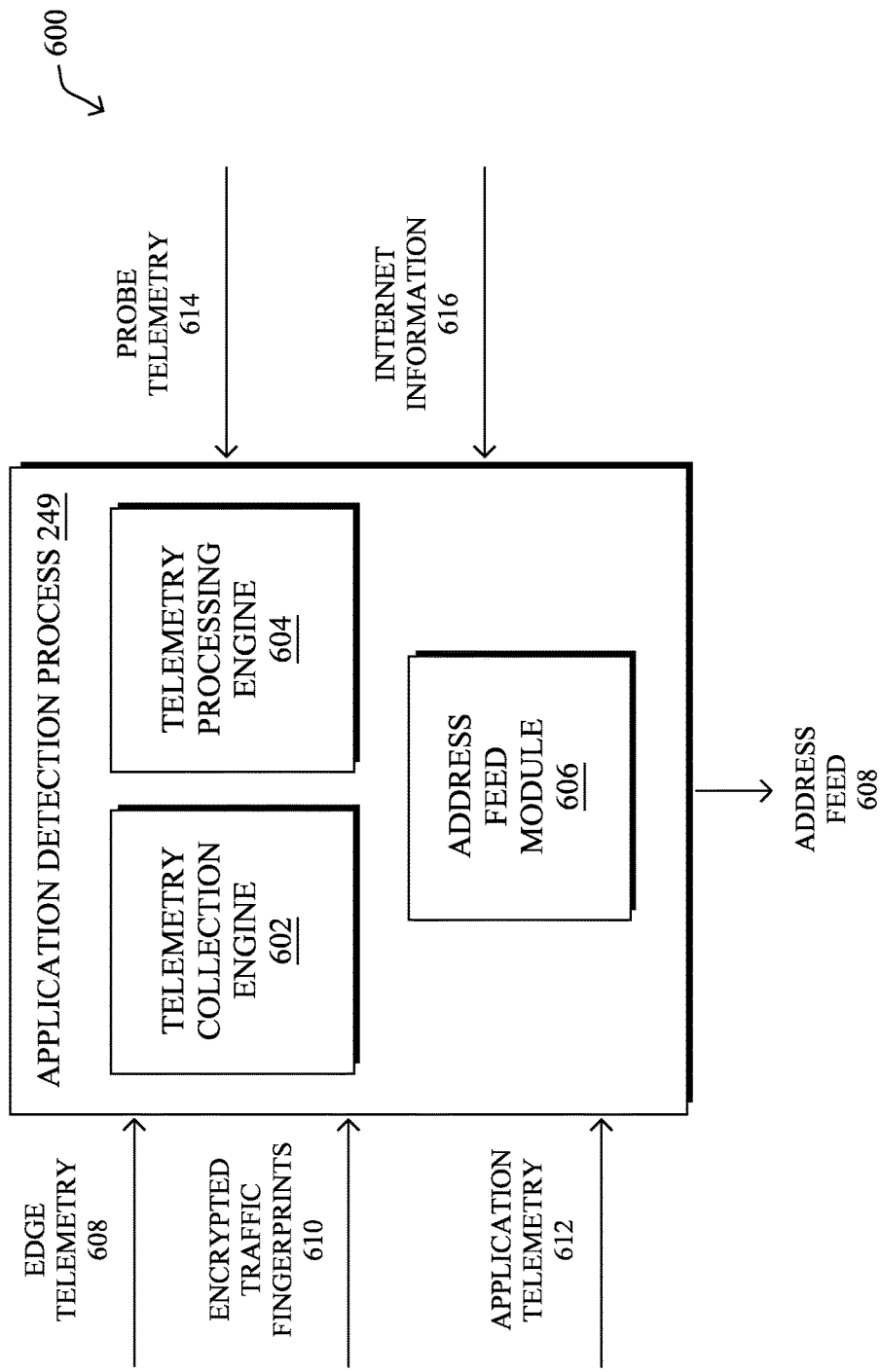
FIG. 6 illustrates an example architecture for using machine learning for online application detection.

Operationally, FIG. 6 illustrates an example architecture for using machine learning for online application detection, according to various embodiments. At the core of architecture 600 is application detection process 249, which may be executed by a controller for a network or another device in communication therewith. For instance, application detection process 249 may be executed by a controller for a network (e.g., SDN controller 408 in FIGS. 4A-4B), a particular networking device in the network (e.g., a router, a firewall, etc.), another device or service in communication therewith, or the like, to provide an application detection service to the network.

As shown, application detection process 249 may include any or all of the following components: a telemetry collection engine 602, a telemetry processing engine 604, and/or an address feed module 606. As would be appreciated, the functionalities of these components may be combined or omitted, as desired. In addition, these components may be implemented on a singular device or in a distributed manner, in which case the combination of executing devices can be viewed as their own singular device for purposes of executing application detection process 249.

In various embodiments, telemetry collection engine 602 may be responsible for obtaining any or all of the following telemetry (e.g., on a pull or push basis):

Edge telemetry 608—Here, edge devices (e.g., routers, firewalls, etc.) may send their application recognition telemetry to telemetry collection engine 602. For instance, edge telemetry 608 may include aggregated statistics per flow (and/or per application per flow) like number of bytes per direction (upstream/downstream), packets (send, received), recognized application, recognition details (e.g., engine, engine ID, detection method, detection method details). It can also include additional telemetry like inter packet spacing, frequency/statistics, TLS fingerprint, or the like.

Encrypted traffic fingerprints 610—As would be appreciated, encrypted network traffic often exhibits certain patterns, such as their sequence of packet lengths and arrival times (SPLT) information, byte sizes, etc., making it possible to infer the application associated with the traffic without having to decrypt the traffic (e.g., to detect malware, etc.). For instance, Cisco Encrypted Traffic Analytics (ETA) fingerprints could provide additional telemetry in the way of traffic fingerprints for model training (e.g., as labels and/or input features).

Application telemetry 612—In some instances, telemetry collection engine 602 may also obtain telemetry data from the online application under consideration, as well. For instance, WebEx reports a detailed report every sixty seconds from every WebEx client. Such telemetry includes the public IP address of the WebEx media server that client is currently using (it's application-level telemetry). Thus, it is possible to leverage this information to discover a new WebEx SaaS IP addresses as soon as it is used by any WebEx client. Similarly, other applications could also report this type of information via an API to telemetry collection engine 602.

Probe telemetry 614—In some instances, telemetry collection engine 602 may also obtain telemetry from a probing service within the network that perform synthetic probing of the network paths and online applications accessible via the network. For instance, Thousand Eyes agents running transaction test for SharePoint application are able to gather all networking and application-level telemetry and easily discover global entry points (IP addresses) for the SharePoint application. As a result, it can discover immediately new IP addresses of the SaaS application, and those results can be passed to telemetry collection engine 602 as part of probe telemetry 614.

Internet information 616—telemetry collection engine 602 may also obtain Internet information such as the autonomous system number, the email address attached to the IP owner or domain owner, BGP information, or the like. Such attributes could be useful to help the trained model distinguish between the applications associated with the network traffic.

As noted above, some telemetry sources like WebEx or ThousandEyes do allow for the almost immediate discovery of new IP addresses associated with an online application and without any additional analytics. That is because those services can target a specific application and the server IP address has to belong to that specific application. In various embodiments, other telemetry sources like router application recognition telemetry, such as from Network Based Application Recognition (NBAR), SDAVC, and the like, allows for the training of a machine learning model with the same goal: discovering a new IP address of a particular online application. This can be done, for instance, by using the recognized application information from these application detection services (e.g., the recognized applications) as labels and using an input feature vector (e.g., the flow details), to classify a given IP address (e.g., as being related or not to the application of interest).

According to various embodiments, telemetry processing engine 604 may be configured to take as input the telemetry collected by telemetry collection engine 602 (e.g., the application recognition information in edge telemetry 608, etc.) and normalize the data for use with a machine learning model. Here, telemetry processing engine 604 could train such a model using labels that have a high degree of confidence, as the application detection service supplies the identity of the application. For instance, Cisco's NBAR application recognition can be based on the HTTP host or TLS SNI (not a first packet detection approach). Another high confidence label would be the one received via application detection based on SDAVC vendor's feed. Those labels would also be useful as ground truth for training the machine learning model.

In some embodiments, the input feature vector for the model trained by telemetry processing engine 604 may include any or all of the statistics that might be application specific, as obtained by telemetry collection engine 602. For example, this could include the flow duration, bytes/packets sent/received, IP addresses, TCP/UDP ports, request/response ratios (bytes/packets), but also more advanced information like packet distribution in time per flow or packet spacing in time or additional applications associated with that one (e.g., Google Docs is always discovered when using QUIC protocol). Another set of input features for the model could be encryption related, (e.g., version, cipher suite proposed/negotiated, certificate details, etc.). For TLS traffic, which is decrypted, there is a whole set of additional input features like HTTP headers, application level data, specific patterns etc., that could also serve as part of the input features for the model.

Telemetry processing engine 604 could employ any number of suitable techniques to train the machine learning model. For instance, telemetry processing engine 604 may represent each application with its own model multiple models. In one embodiment, telemetry processing engine 604 may train a classifier using a Neural Network for each of the applications, a single classifier with multiple output (multi-class), or even an ensemble classifier such as a Gradient Boosted Tree (GBT).

Note that the main goal of telemetry processing engine 604 is to train a machine learning model from telemetry for non-encrypted traffic that is able to build a listing of IP addresses hosting a particular online application. Such IP addresses can then be used to classify traffic (i.e., recognize the application based on the address information of a packet, even for encrypted traffic). Even more importantly, doing so now also becomes possible by assessing just the initial packet of a given traffic flow.

In some embodiments, telemetry processing engine 604 may also apply a data filter to the telemetry collected by telemetry collection engine 602. For instance, telemetry processing engine 604 may exclude IP addresses associated with content delivery networks (CDNs), load balancers, or other shared services, since these types of services could host multiple applications and should be excluded so as not to confuse the model.

Another goal of telemetry processing engine 604 may be to use telemetry from a broad range of sources (e.g., from non-encrypted traffic) and apply the machine learning model to a large range of IP addresses, to update the listing of servers/addresses known as hosting a particular online application. In one embodiment, telemetry processing engine 604 may use the classifier on specific IP addresses that are suspected of being used as a server for an online application. For example, telemetry processing engine 604 may leverage information regarding the ownership of certain IP addresses, to target its analysis (e.g., filtering to use only IP addresses from AS AS8068, AS8069, AS12076 for Microsoft, etc.)

In another embodiment, telemetry processing engine 604 may opt, for the list of already identified IP address, to repeatedly apply the classifier/machine learning model to these addresses, to ensure that they are still associated with a given application. This can be done periodically, on demand, and/or according to a configuration parameter set by an administrator. For instance, if after a configurable period of time, a "known" IP address no longer seem to receive traffic for the already computed set of hosted applications, telemetry processing engine 604 may prune that IP address and update the listing of known addresses, accordingly.

Once telemetry processing engine 604 detects with a high confidence that a specific application is running on a new IP address, it may send a notification to address feed module 606 (e.g., Cisco SDAVC cloud, etc.).

In a more advanced approach, it may also be possible to support an application recognition engine/application detection service based on feeds 618 supplied by address feed module 606 with the listing of IP addresses that are associated with the different online applications. In that case, the recognition engine may have to use statistical attributes and a confidence level. For instance, if a specific IP address was used 85% of time by SharePoint application and a specific flow is having interpacket spacing typical for SharePoint application, the flow is likely associated with SharePoint (note that this type of inference would no longer be based on just the initial packet of the flow).

More specifically, during execution, address feed module 606 may consume the newly discovered application IP addresses from telemetry processing engine 604 and share them as address feed 618 with edge devices like routers or firewalls, allowing them to detect traffic for a particular online application on a first packet.

It also bears mentioning that there is likely no single model or pattern of usage for any given application. For example, O365 PowerPoint might have very different traffic patterns depending on how it's used. Indeed, one PowerPoint user might be creating simple presentation with few pages and mostly text, while another user might have hundreds of pages with very large video. Those will generate very different networking patterns (input feature vector and associated cluster). As a result, telemetry processing engine 604 might be required to have several clusters for a single application and possibly even multiple machine learning models. It is also possible that in some cases, the models will not be global, but also customer/network/user specific.

It is also possible that the operation of application detection process 249 may be enhanced using feedback from a DPI engine running on an edge device. Indeed, DPI may lead to a different application classification and could also quantify its confidence (rating). Here, telemetry processing engine 604 could consume such feedback and use them as both labels and input feature vectors, to improve the performance of its models over time (e.g., this could entail model retraining, testing the model, or even training a new model for the same application).

To summarize the techniques herein using a real-word example, assume that Microsoft has deployed Word Online in a new location (datacenter) with a new IP addresses that is currently not in the official feeds. As a result, that traffic cannot be yet recognized as Office365 (traffic is encrypted and difficult to classify). DPI engines running on SD-WAN routers may send statistics regarding the traffic to this address to telemetry collection engine 602. For instance, telemetry collection engine 602 may collect the traffic patterns like packet size, spacing in time, request/response ratios, TLS fingerprints, and others.

Then, based on those input features, telemetry processing engine 604 may classify those traffic flows into a know cluster specific to Word Office365 (with high confidence). High confidence is achieved based on high quality input features and past labels received from trusted/valid sources (e.g., DPI inspection of TLS decrypted traffic for Word). As a result, telemetry processing engine 604 can discover new IP addresses specific to Word Office365. Finally, address feed module 606 may push out an updated address feed 618 that SD-WAN routers could use to recognize new traffic as being associated with Microsoft Word, based on a match between the address in the initial packet of a flow and the address added to the updated list. In turn, such an edge device can apply any network policies to the flow, accordingly, and/or trigger other application-specific functions, such as predicting the QoE for the application.

Figure 7:
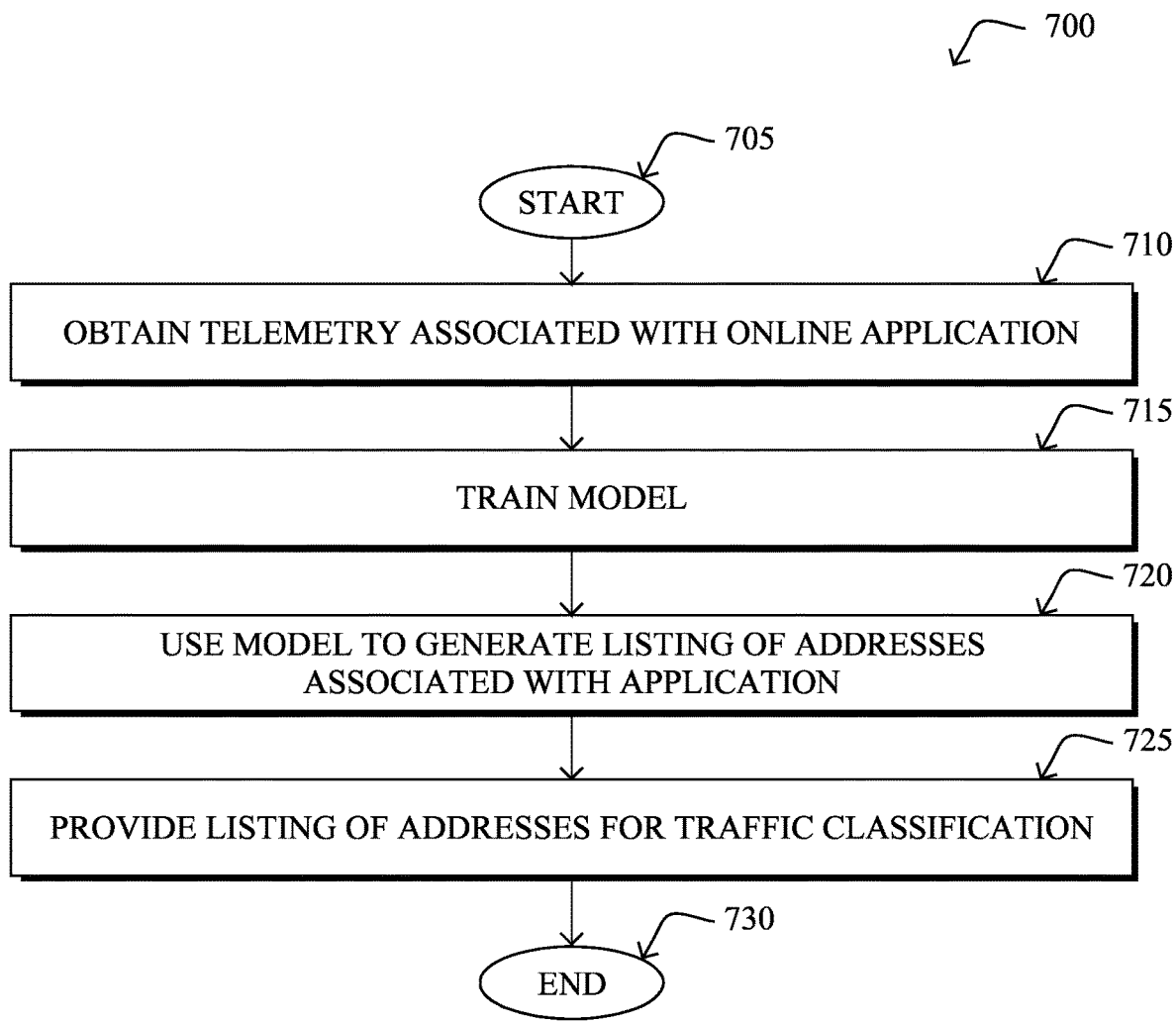
FIG. 7 illustrates an example simplified procedure for using machine learning for online application detection.

FIG. 7 illustrates an example simplified procedure 700 (e.g., a method) procedure for using machine learning for online application detection, in accordance with one or more embodiments described herein. For example, a non-generic, specifically configured device (e.g., device 200), such as a router, firewall, controller for a network (e.g., an SDN controller or other device in communication therewith), or the like, may perform procedure 700 by executing stored instructions (e.g., application detection process 249). The procedure 700 may start at step 705, and continues to step 710, where, as described in greater detail above, the device may obtain telemetry data associated with an online application accessible via a network. In some embodiments, the telemetry data comprises a listing of addresses in use reported by the online application. In further embodiments, the telemetry data comprises traffic statistics of traffic associated with the online application. In another embodiment, the telemetry data comprises telemetry generated by a path probing service in the network.

At step 715, as detailed above, the device may train, based on the telemetry data, a machine learning model to determine whether a given address in the network is associated with the online application. For instance, the machine learning model may take as input a network address and the telemetry data for traffic associated with that address and output an indication (e.g., a classification) as to whether the address is likely associated with the online application.

At step 720, the device may use the machine learning model to generate a listing of network addresses associated with the online application, as described in greater detail above. In various embodiments, the device may do so by applying the machine learning model to a range of network addresses suspected of being associated with the online application. In some embodiments, the device may also exclude a particular network address from inclusion in the listing of network addresses based on it being associated with a content delivery network (CDN) or load balancer.

At step 725, as detailed above, the device may provide the listing of network addresses for use by an application detection service in the network to determine that an initial packet of a traffic flow is associated with the online application based on a match between a destination address of that packet and a network address in the listing of network addresses. In various embodiments, the application detection service determines that the initial packet of a traffic flow is associated with the online application without decrypting the initial packet or applying deep packet inspection to the initial packet. In some embodiments, the application detection service is executed by a router or firewall. In further embodiments, the application detection service applies a network policy to the traffic flow based on its determination that the initial packet of the traffic flow is associated with the online application. In one embodiment, the network policy controls how the traffic flow is routed in the network.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for using machine learning for online application detection, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, telemetry data associated with an online application accessible via a network;
   training, by the device and based on the telemetry data, a machine learning model to determine whether a given address in the network is associated with the online application, wherein the telemetry data is filtered to exclude addresses that host multiple applications;
   using, by the device, the machine learning model to generate a listing of network addresses associated with the online application; and
   providing, by the device, the listing of network addresses for use by an application detection service in the network to determine that an initial packet of a traffic flow, without decrypting the initial packet, is associated with the online application based on a match between a destination address of that packet and a network address in the listing of network addresses.

2. The method as in claim 1, wherein the telemetry data comprises a listing of addresses in use reported by the online application.

3. The method as in claim 1, wherein the telemetry data comprises traffic statistics of traffic associated with the online application.

4. The method as in claim 1, wherein the application detection service is executed by a router or firewall.

5. The method as in claim 1, wherein the application detection service determines that the initial packet of a traffic flow is associated with the online application without or applying deep packet inspection to the initial packet.

6. The method as in claim 1, wherein the application detection service applies a network policy to the traffic flow based on its determination that the initial packet of the traffic flow is associated with the online application.

7. The method as in claim 6, wherein the network policy controls how the traffic flow is routed in the network.

8. The method as in claim 1, further comprising:
excluding, by the device, a particular network address from inclusion in the listing of network addresses based on it being associated with a content delivery network (CDN) or load balancer.

9. The method as in claim 1, wherein the telemetry data comprises telemetry generated by a path probing service in the network.

10. The method as in claim 1, wherein using the machine learning model to generate the listing of network addresses associated with the online application comprises:
applying the machine learning model to a range of network addresses suspected of being associated with the online application.

11. An apparatus, comprising:
one or more network interfaces;
a processor coupled to the one or more network interfaces and configured to execute one or more processes; and
a memory configured to store a process that is executable by the processor, the process when executed configured to:
obtain telemetry data associated with an online application accessible via a network;
train, based on the telemetry data, a machine learning model to determine whether a given address in the network is associated with the online application, wherein the telemetry data is filtered to exclude addresses that host multiple applications;
use the machine learning model to generate a listing of network addresses associated with the online application; and
provide the listing of network addresses for use by an application detection service in the network to determine that an initial packet of a traffic flow, without decrypting the initial packet, is associated with the online application based on a match between a destination address of that packet and a network address in the listing of network addresses.

12. The apparatus as in claim 11, wherein the telemetry data comprises a listing of addresses in use reported by the online application.

13. The apparatus as in claim 11, wherein the telemetry data comprises traffic statistics of traffic associated with the online application.

14. The apparatus as in claim 11, wherein the application detection service is executed by a router or firewall.

15. The apparatus as in claim 11, wherein the application detection service determines that the initial packet of a traffic flow is associated with the online application without applying deep packet inspection to the initial packet.

16. The apparatus as in claim 11, wherein the application detection service applies a network policy to the traffic flow based on its determination that the initial packet of the traffic flow is associated with the online application.

17. The apparatus as in claim 16, wherein the network policy controls how the traffic flow is routed in the network.

18. The apparatus as in claim 11, wherein the process when executed is further configured to:
exclude a particular network address from inclusion in the listing of network addresses based on it being associated with a content delivery network (CDN) or load balancer.

19. The apparatus as in claim 11, wherein the telemetry data comprises telemetry generated by a path probing service in the network.

20. A tangible, non-transitory, computer-readable medium storing program instructions that cause a device to execute a process comprising:
obtaining, by the device, telemetry data associated with an online application accessible via a network;
training, by the device and based on the telemetry data, a machine learning model to determine whether a given address in the network is associated with the online application, wherein the telemetry data is filtered to exclude addresses that host multiple applications;
using, by the device, the machine learning model to generate a listing of network addresses associated with the online application; and
providing, by the device, the listing of network addresses for use by an application detection service in the network to determine that an initial packet of a traffic flow, without decrypting the initial packet, is associated with the online application based on a match between a destination address of that packet and a network address in the listing of network addresses.

* * * * *

UNITED STATES PATENT AND TRADEMARK OFFICE
CERTIFICATE OF CORRECTION

| | | |
|---|---|---|
| PATENT NO. | : 12,155,532 B1 | Page 1 of 1 |
| APPLICATION NO. | : 18/201555 | |
| DATED | : November 26, 2024 | |
| INVENTOR(S) | : Michal Wladyslaw Garcarz et al. | |

It is certified that error appears in the above-identified patent and that said Letters Patent is hereby corrected as shown below:

In the Specification

Column 7, Line 66 should read as follows:
(e.g., ADSL, 4G, 5G, etc.) in all cases, as well as various Column 8, Line 20 should read as follows:
404. For instance, SDN controller 408 may be responsible Column 8, Line 49 should read as follows:
workloads. On the network side, SD-WAN provides a high Column 8, Line 52 should read as follows:
benefit from a plethora of transport access (e.g., MPLS Column 9, Line 15 should read as follows:
made to extend the notion of routing, CSPF, link state Column 9, Line 32 should read as follows:
Modern SaaS solutions like Viptela, CloudonRamp SaaS, Column 10, Line 34 should read as follows:
such as SD-WAN, Hybrid Work, and Zero Trust Network Column 11, Line 15 should read as follows:
(e.g., often referred to as layer violation) to be avoided, at a Column 11, Line 36 should read as follows:
(e.g., PHY, MAC, etc.) independent of each other, and Signed and Sealed this
Fourth Day of March, 2025

Coke Morgan Stewart
*Acting Director of the United States Patent and Trademark Office*